US011088807B2

(12) United States Patent
Pollack et al.

(10) Patent No.: US 11,088,807 B2
(45) Date of Patent: Aug. 10, 2021

(54) APPLICATION-LEVEL ACKNOWLEDGEMENTS

(71) Applicant: Apple Inc., Cupertino, CA (US)

(72) Inventors: Daniel B. Pollack, San Francisco, CA (US); Justin N. Wood, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 847 days.

(21) Appl. No.: 14/475,522

(22) Filed: Sep. 2, 2014

(65) Prior Publication Data

US 2015/0349934 A1 Dec. 3, 2015

Related U.S. Application Data

(60) Provisional application No. 62/005,565, filed on May 30, 2014.

(51) Int. Cl.
*H04L 5/00* (2006.01)
*H04L 1/24* (2006.01)
*H04L 29/00* (2006.01)
*H04L 29/08* (2006.01)
*H04L 1/18* (2006.01)

(52) U.S. Cl.
CPC .......... *H04L 5/0055* (2013.01); *H04L 1/1887* (2013.01); *H04L 1/24* (2013.01); *H04L 29/00* (2013.01); *H04L 67/327* (2013.01)

(58) Field of Classification Search
CPC ......... H04L 5/0055; H04L 1/24; H04L 29/00; H04L 5/00; H04L 63/08; H04L 67/306; H04L 67/42; H04L 29/06027; H04L 67/24; H04L 67/327; H04L 1/887; H04W 8/18; H04W 4/80; H04W 48/18; G06F 21/43; G06F 9/542; H04N 1/00307
USPC .................. 709/237, 230; 370/329; 710/105
See application file for complete search history.

(56) References Cited

U.S. PATENT DOCUMENTS

| 7,826,487 | B1 * | 11/2010 | Mukerji | H04L 43/026 |
| | | | | 370/394 |
| 8,548,131 | B1 * | 10/2013 | Lavian | H04M 3/493 |
| | | | | 379/88.18 |
| 9,491,261 | B1 * | 11/2016 | Shagam | H04L 67/40 |
| 2003/0135628 | A1 * | 7/2003 | Fletcher | H04L 29/06 |
| | | | | 709/229 |
| 2003/0158892 | A1 * | 8/2003 | Conneely | H04L 67/04 |
| | | | | 709/203 |

(Continued)

*Primary Examiner* — Tonia L Dollinger
*Assistant Examiner* — Mehulkumar J Shah
(74) *Attorney, Agent, or Firm* — Kilpatrick Townsend & Stockton LLP

(57) ABSTRACT

Application-level acknowledgements may be used to verify that a data packet has not only been received, but has been successfully processed by the appropriate application operating on a device that received the data packet. For example, in one embodiment, two devices may be registered with an identity service that enables security and push messaging. A first device may communicate a data packet to another device that is associated with the same identity account through the identity service. The device receiving the data packet may send an acknowledgement verifying receipt of the data packet. After an application has processed the data packet, an acknowledgement that the data packet was processed may also be send from the second device to the first device.

20 Claims, 8 Drawing Sheets

(56) References Cited

U.S. PATENT DOCUMENTS

| | | | | |
|---|---|---|---|---|
| 2004/0034776 A1* | 2/2004 | Fernando | ............... | H04L 9/0825 |
| | | | | 713/171 |
| 2005/0094667 A1* | 5/2005 | Dahlman | ............... | H04L 1/1819 |
| | | | | 370/473 |
| 2007/0073828 A1* | 3/2007 | Rao | ..................... | H04L 67/1097 |
| | | | | 709/217 |
| 2009/0177793 A1* | 7/2009 | Josa | ........................ | G06F 21/10 |
| | | | | 709/231 |
| 2010/0046443 A1* | 2/2010 | Jia | ....................... | H04W 76/021 |
| | | | | 370/329 |
| 2010/0074366 A1* | 3/2010 | Jia | ........................ | H04L 1/1854 |
| | | | | 375/295 |
| 2010/0165838 A1* | 7/2010 | Bakshi | ................ | H04L 43/0829 |
| | | | | 370/229 |
| 2010/0281169 A1* | 11/2010 | Charles | .................. | H04L 67/24 |
| | | | | 709/227 |
| 2011/0300802 A1* | 12/2011 | Proctor, Jr. | ........... | H04W 4/029 |
| | | | | 455/41.2 |
| 2012/0005369 A1* | 1/2012 | Capone | .................. | H04L 29/06 |
| | | | | 709/236 |
| 2012/0311686 A1* | 12/2012 | Medina | ................ | H04L 63/0807 |
| | | | | 726/7 |
| 2013/0019025 A1* | 1/2013 | Chaturvedi | ....... | H04L 29/06517 |
| | | | | 709/231 |
| 2013/0111003 A1* | 5/2013 | Burckart | ................. | H04L 67/26 |
| | | | | 709/223 |
| 2013/0227656 A1* | 8/2013 | Holtmanns | ......... | H04L 63/0892 |
| | | | | 726/4 |
| 2013/0229673 A1* | 9/2013 | Nakayama | ......... | H04N 1/00127 |
| | | | | 358/1.13 |
| 2013/0244614 A1* | 9/2013 | Santamaria | ......... | H04W 12/069 |
| | | | | 455/411 |
| 2014/0376521 A1* | 12/2014 | Wang | ...................... | H04L 43/16 |
| | | | | 370/336 |
| 2015/0089568 A1* | 3/2015 | Sprague | .............. | H04L 63/0876 |
| | | | | 726/1 |
| 2015/0208141 A1* | 7/2015 | Kim | ........................ | G08C 17/02 |
| | | | | 340/870.07 |
| 2015/0327230 A1* | 11/2015 | Takeda | .................. | H04L 1/1607 |
| | | | | 370/329 |

* cited by examiner

APPLICATION-LEVEL ACKNOWLEDGEMENTS

CROSS-REFERENCES TO RELATED APPLICATIONS

The present application claims priority from and is a nonprovisional application of U.S. Provisional Application 62/005,565 entitled "Application-Level Acknowledgements" by Pollack et al. (Ref. No. P23189USP1), filed May 30, 2014, the entire contents of which are herein incorporated by reference for all purposes.

The present application is also related to U.S. Provisional Applications:
62/005,550 entitled "ANSWER AND HOLD WITH CLIENT AND HOST" by Rauenbuehler et al. (Ref. No. P23172USP1), filed May 30, 2014;
62/005,534, entitled "ANSWERING A CALL WITH CLIENT THROUGH A HOST" (Ref. No. P23171USP1), filed May 30, 2014;
62/005,565 entitled "PROXIED PUSH" by Pollack et al. (Ref. No. P23053USP1), filed May 30, 2014;
62/005,336 entitled "SMS PROXYING" by Circosta et al. (Ref. No. P23192USP1), filed May 30, 2014;
62/005,505 entitled "MANAGING CONNECTIONS OF A USER DEVICE" by Schobel et al. (Ref. No. P23295USP1), filed May 30, 2014;
62/005,606 entitled "CLIENT APPLICATIONS COMMUNICATING VIA A USER TUNNEL" by Tung et al. (Ref. No. P23188USP1), filed May 30, 2014;
62/005,586 entitled "MESSAGES WITH ATTENUATING RETRANSMIT IMPORTANCE" by Pollack et al. (Ref. No. P23190USP1), filed May 30, 2014; and
62/005,799 entitled "PROTOCOL SWITCHING IN INTER-DEVICE COMMUNICATION" by Prats et al. (Ref. No. P22319USP1), filed May 30, 2014, which are hereby incorporated by reference for all purposes. The present application is also related to U.S. Provisional Application 61/953,591 entitled "DYNAMIC LINK ADAPTATION FOR IMPROVED LINK MARGIN," by Liu et al., filed Mar. 14, 2014, which hereby incorporated by reference for all purposes.

BACKGROUND

With a proliferation of different types of networked devices, a single user that in the past may have only had one computer or one phone may now have a desktop computer, a laptop computer, a mobile phone, a tablet, networked wearable devices, networked home appliances, and other networked devices. Managing communications in such an environment is an increasingly complex task.

As part of such communications, various types of acknowledgements are commonly used in communications systems. Acknowledgements provide verifications to a sending device that a previously sent communication was received. In various protocols such as the standard transmission control protocol (TCP), which is a core protocol of the internet protocol (IP) suite, acknowledgements are used as part of many or all communications. Standard acknowledgements provide information indicating that a communication was received, which can verify that there is no issue with a transmission channel. But, such acknowledgements may not prove helpful in some situations.

Embodiments described herein may include devices, systems, and methods for managing communications in this context.

BRIEF SUMMARY

Embodiments can provide methods, systems, and devices for application-level acknowledgements. For example, application-level acknowledgements may be used to verify that a data packet has not only been received, but has been successfully processed by the appropriate application operating on a device that received the data packet. For example, in one embodiment, two devices may be registered with an identity service that enables security and push messaging. A first device may communicate a data packet to another device that is associated with the same identity account through the identity service. The device receiving the data packet may send an acknowledgement verifying receipt of the data packet. After an application has processed the data packet, an acknowledgement that the data packet was processed may also be send from the second device to the first device.

Other embodiments are directed to systems, portable consumer devices, and computer readable media associated with methods described herein.

A better understanding of the nature and advantages of embodiments of the present invention may be gained with reference to the following detailed description and the accompanying drawings.

DETAILED DESCRIPTION

Embodiments herein relate to the used of application-level acknowledgements as part device communications. In particular, embodiments may include standard transmission level (e.g. TCP) acknowledgements, messaging-level acknowledgements that indicate a messaging process of a receiving device has accepted a data packet, and application-level acknowledgements that indicates an application on the receiving device has successfully processed the incoming data packet.

For example, in one embodiment, a user's phone may communicate with a wearable device such as a network enabled wristwatch to synchronize photos between the watch and the phone by sending data from the phone to the watch. The phone and the wristwatch may each be running photo applications that communicate with each other as part of the synchronization. The applications may each rely on various daemons or communication management processes on the associated devices that assist with communication between applications.

Rather than simply relying on applications to receive a communication, process the communication, and then initiate a separate communication to indicate that the received information has been processed, the management processes may implement an acknowledgement system. When the watch receives data from the phone, a management process may communicate an acknowledgement back to the phone that the data was received. The management processes on the watch may then pass the data to the application on the watch. When the application returns to the management processes after disposing of the data, the management processes may then send an additional acknowledgement (e.g., indicating that the application processed the data) back to the phone. When the phone either receives or fails to receive one or more of the acknowledgements, the phone may make use of this information to make decisions on future communications.

I. Introduction

In some embodiments, network servers may interact with the management processes to assist with the communications. For example, a management framework or management proxy may exist in a communication path between the phone and the device. Such a management proxy may assist with retransmission of data that is not correctly processed, and may provide other information to the devices to assist with communications between the devices.

A. System

Figure 1:
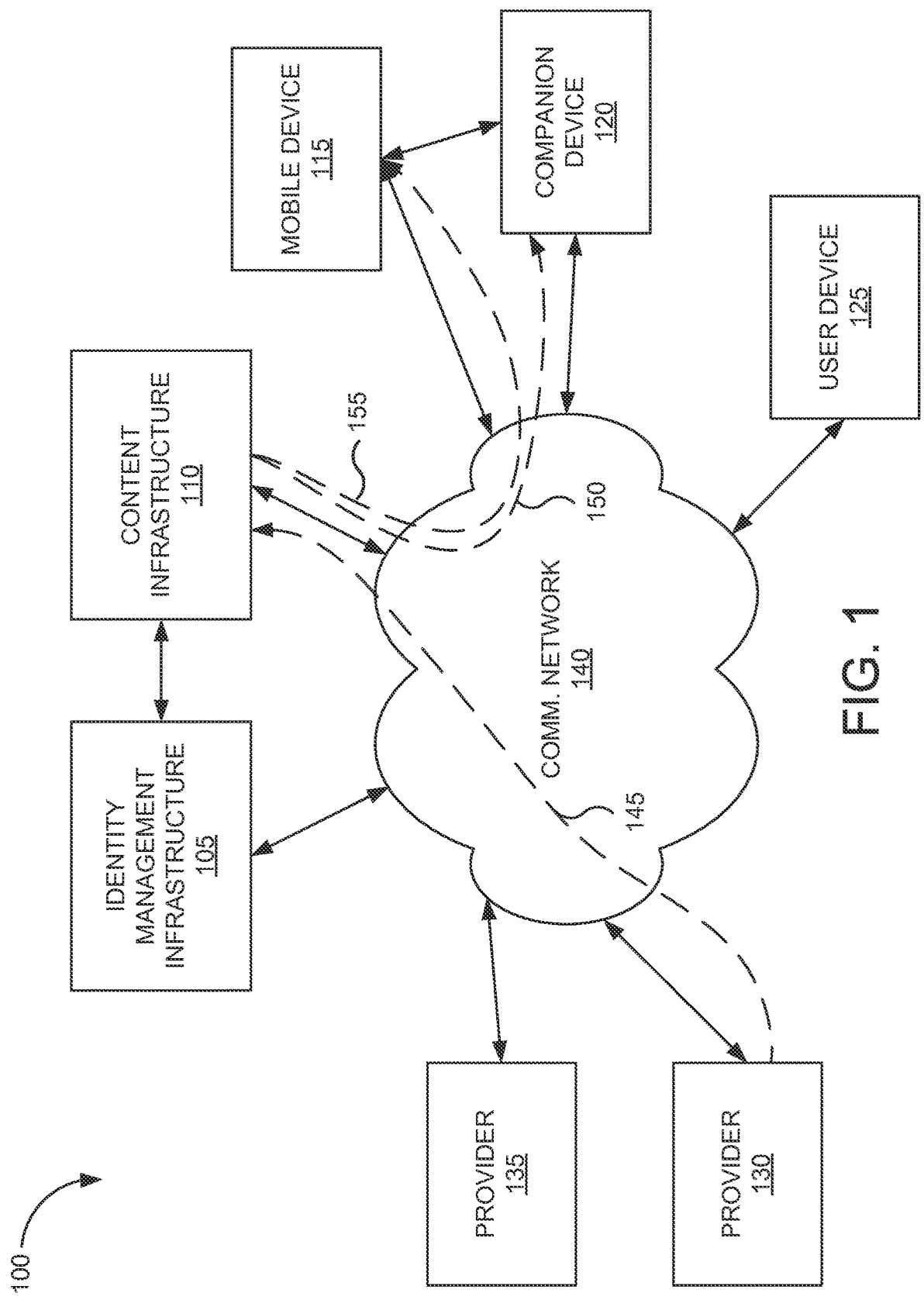
FIG. 1 is a block diagram of a system composed of one or more clients, hosts (e.g., a companion device), and servers communicating messages among each other according to various embodiments.

FIG. 1 is a block diagram of a system 100 according to various embodiments. FIG. 1 and other figures are merely illustrative of an embodiment or implementation, or of aspects of an embodiment or implementation disclosed herein, and should not limit the scope of any invention as recited in the claims. One of ordinary skill in the art may recognize through this disclosure and the teachings presented herein other variations, modifications, and/or alternatives to those embodiments or implementations illustrated in the figures. FIG. 1 is one example of a system which may use application-level acknowledgements according to various embodiments. The devices in system 100 can include hardware and/or software elements.

In one embodiment, system 100 includes an identity management infrastructure 105 (i.e., one or more servers that implement an identity management service, authorization service, and/or authentication service), content infrastructure 110 (i.e., one or more servers that implement a voice/video call service, a messaging service, and/or a push notification service), mobile device 115, companion device 120, user device 125, provider 130, provider 135, and communications network 140. As illustrated, identity management infrastructure 105, content infrastructure 110, mobile device 115, companion device 120, user device 125, provider 130, and provider 135 are each capable of communicating with and through communications network 140 (representing the Internet, wide area networks (WANs), metropolitan area networks (MANs), local area networks (LANs), wireless area networks (WiLANs), radio access network (RANs), public switched telephone network (PTSN), etc., and/or combinations of the same). As illustrated, mobile device 115 can communicate directly with companion device 120 without utilizing communications network 140.

Identity management infrastructure 105 may be implemented in various embodiments using a single server computer system or may include multiple server computer systems, web servers, application servers, networks, interconnects, and the like. In various aspects, identity management infrastructure 105 provides management of individual entities, their authentication, authorization, and privileges within or across systems, such as content infrastructure 110. Identity management services provided by identity management infrastructure 105 can include technologies and services such as Active Directory, identity providers, password managers, access control providers, single sign-on (SSO) services, OAuth, security token services, or the like.

In various embodiments, identity management infrastructure 105 maintains information that authenticates the identity of a managed entity (such as a user, organization, and any associated devices, resources, services, applications, or the like). Identity management infrastructure 105 can verify that an entity is who/what it claims to be using a password, biometrics such as a fingerprint, a distinctive behavior such as a gesture pattern on a touchscreen, challenge-response protocols, one-time passwords (OTPs), 2-way authentications, and other techniques. Identity management infrastructure 105 further can manage authorization information that defines what operations an entity can perform in the context of a specific application, service, or resource. Some authorizations may be based on a role, device type, application, application type, or the like associated with a managed entity. Users are granted roles often related to a particular job or job function. Identity management infrastructure 105 can also manage descriptive information about managed entities and how and by whom that information can be accessed and modified. As part of identity management, one or more host devices may be identified and associated with one or more client devices, such that incoming calls, text messages, or other communications to the host devices may be relayed to the client devices. In certain embodiments, communications as part of these processes may use application-level acknowledgements.

In some embodiments, identity management infrastructure 105 creates digital identities for managed entities encompassing, for example, entity identifying information (PII) and ancillary information. In one aspect, a managed entity can have multiple digital identities and each digital identity can encompass multiple attributes. For example, a user can have a user identifier (e.g., a phone number, e-mail, etc.) that is linked to multiple devices. In addition to creation, deletion, modification of digital identities, identity management infrastructure 105 can manage ancillary entity data for use by services, such content infrastructure service 110.

In further embodiments, identity management infrastructure 105 can store capabilities of each device associated with a user identifier. Examples of device capabilities include whether a device includes a specific type or version of hardware, whether a device includes a specific type or version of software (e.g., operating systems or applications), whether a device is capable of performing a specific function such as placing and receiving phone calls or sending and receiving short message service (SMS)/multimedia message service (MMS) messages, whether a device is capable of maintaining connections with other devices, or the like. The list of devices associated with a user can be sent to and stored at any other device of that user, such as mobile device 115 and companion device 120 when associated with the same user identifier. Identity management infrastructure 105 can determine and collect capabilities of a device when it is registered and associated with the user identifier. Identity management infrastructure 105 can update the capabilities of a device periodically, for example, when the device re-registers or communicates with one or more services managed by identity management infrastructure 105.

In various embodiments, identity management infrastructure 105 can receive a single user identifier, which is used to determine device identifiers for devices associated with the user identifier. During entity registration, in order to access services or resources managed by identity management infrastructure 105, one or more user or other identifiers and a unique entity or device identifier (UID) may be combined to generate an entity or device token. In various embodiments, the token is encrypted by applying a hashing algorithm (e.g., SHA-0, SHA-1, SHA-2, MD5, Whirlpool, or other hashing algorithms). The token generated and encrypted for an entity can remain constant in various embodiments. Once a token has been generated and encrypted by identity management infrastructure 105, the token can be sent back to the entity. The entity in some aspects can then distribute the token to services or resources managed by identity management infrastructure 105 or other third party services for a variety of purposes relating to authentication, authorization, accounting, or the like of the entity at those managed services or resources or the trusted delivery of content to the entity by the third parties.

Content infrastructure 110 may be protected by and/or accessible to entities managed by identity management infrastructure 105. Content infrastructure 110 may be implemented in various embodiments using a single server computer system or may include multiple server computer systems, web servers, application servers, networks, interconnects, and the like.

Content infrastructure 110 can provide content to mobile device 115, companion device 120, and user device 125 as well as to other devices and entities. Examples of content include a text message, a multimedia message, an impending calendar event, an audio/video call (e.g., using VOIP), or a notification of new data on a remote server. In one embodiment, the content can originate from one or more sources managed by identity management infrastructure 105 or provided directly by content infrastructure 110. In other embodiments, the content can originate from other sources. For example, content may originate from any one of mobile device 115, companion device 120, user device 125, and providers 130 and 135.

In another example, content may be received from other sources such as the Internet, cellular networks, public switched telephone networks, and the like. Content infrastructure 110 can then route the content to mobile device 115, companion device 120, user device 125, and providers 130 and 135. In one embodiment, content infrastructure 110 may route through the infrastructure an SMS message received from or destined to a cellular network. In another embodiment, content infrastructure 110 may route through the infrastructure a voice call received from or destined to a public switched telephone network.

In some embodiments, the content sent to mobile device 115 can be forwarded to companion device 120 for delivery to mobile device 115. Companion device 120 can also act and send signals on behalf of mobile device 115. In these embodiments, companion device 120 acts as a main or intermediary device and mobile device 115 acts as a proxied device. Content infrastructure 110 can coordinate how and whether companion device 120 can act and send signals on behalf of mobile device 115.

In some embodiments, content infrastructure 110 can send content to more than one device, when appropriate. A user may be associated with both mobile device 115 and companion device 120. Content infrastructure 110 may route the content to both mobile device 115 and companion device 120, such as to have a VOIP phone call ring on both devices or to have a message appear in the inbox of the same application installed on both devices. In other embodiments, content is sent to only one device, e.g., to companion device 120, which may forward a call to mobile device 115. When a call is being forwarded to a device, a phone number can identify which device is to receive the phone/video call, and that device can relay a call between devices as appropriate.

In one aspect, content can include of one or more pieces of data, such as a device identifier (or token) as discussed above and a payload. A device token can be provided in content originating from a provider (e.g., provider 130 and/or 135), a device of a same user (e.g., from either mobile device 115 or companion device 120), or a device of another user (e.g., user device 125), together with any payload the provider seeks to have delivered using content infrastructure 110. The device token can contain information that enables content infrastructure 110 to locate a device on which a particular service or client application is installed and that is registered to receive the content. The payload may include new information received at a server application or a reference to where the information is to be found. The payload may further include a property list that specifies how the user is to be alerted about this new information by the particular service or client application.

An alert can come in a variety of forms. In one example, content can be displayed to a user as an alert message or other visual representation, such as a badge associated with an application icon. Availability of the content further can be announced by playing a sound when an alert or badge is shown. When a user is notified that an application or service has a message, event, or other content data for them, they can launch the application or service and see the details by either viewing the content, viewing information contained in a push notification, having the client application retrieve the referenced information, or the like. The user can also choose to ignore the notification, in which case the application is not activated.

As alluded to above, content infrastructure 110 can include push notification services that in addition to or in the alternative of routing content implement mechanisms to give client applications of push providers that are on user devices the ability to let users know that new content is available at one or more server applications, is on the device, or is incoming. A push provider (or simply provider) as used herein can refer to an entity having information to be forward and/or delivered using a push notification infrastructure. Generally, software developers (acting as providers) originate notifications in their server software when new data is available for users. A provider connects its server software with content infrastructure 110 through a persistent and secure channel. Identity management infrastructure 105 can ensure that the provider is authenticated (e.g., that the provider is who the provider alleges to be) and authorized to connect and utilizes content infrastructure 110 in a trusted manner.

While monitoring for incoming data intended for its client applications, when new data for an application arrives, the provider prepares and sends in one aspect a notification through its channel connection to content infrastructure 110, which pushes the notification to a push consumer or destination target device. Identity management infrastructure 105 can also ensure that the consumer or destination target device is authenticated and authorized to connect to and utilizes services of content infrastructure 110 in a trusted manner. A push consumer (or simply consumer or destination) can refer to an entity designated to receive information forwarded and/or delivered using content infrastructure 110. Although the above describes a provider as the originator of content or a notification of available content for the sake of simplicity, a provider in one instance may in turn become a consumer in another, and vice versa. Additionally, mobile device 115 may be a provider of content to companion device 120, and vice versa as well has provider 130 providing content to provider 135, and vice versa.

In one example of operation of content infrastructure 110, one or more server computers provide, provision, manage, and otherwise operate the push notification service for propagating information between provider 130, provider 135, mobile device 115, companion device 120, and user device 125. Each may establish at least one persistent connection (e.g., an accredited and encrypted Internet protocol (IP) connection) with content infrastructure 110 to originate and/or receive content over this persistent connection. As noted above, each and their connections can be authenticated and authorized by identity management infrastructure 105.

If a notification delivered by content infrastructure 110 for an application associated with a user's device arrives when the application is not running, the user's device may alert the user that the application has data waiting for it as discussed above. Content infrastructure 110 may also provide a default quality-of-service component that provides store-and-forward capabilities. If content infrastructure 110 attempts to deliver a notification but a target device is offline, the notification can be stored for a limited period of time, and delivered to the device when it becomes available. In some embodiments, all recent notification for a particular application is stored. In some embodiments, only one recent notification for a particular application is stored. For example, if multiple notifications are sent while the device is offline, each new notification causes the prior notification to be discarded. This behavior of keeping only the newest notification is referred to as coalescing notifications. In other embodiments, if the device remains offline for a long time, any notifications that were being stored for it may be discarded.

Provider 130 and provider 135 may be implemented in various embodiments using a single server computer system or may include multiple server computer systems, web servers, application servers, networks, interconnects, and the like. In various aspects, provider 130 and provider 135 provide client applications that run on mobile device 115, companion device 120, and user device 125 and server applications that provide one or more services to which the client applications can connect. Provider 130 and provider 135 may seek to notify the client applications accessible to one or more of mobile device 115, companion device 120, and user device 125 that information is available to their respective users.

In one aspect, a push provider is a software developer, company, or organization that maintains server software configured to interact with one or more client applications on one or more of mobile device 115, companion device 120, and user device 125. Provider 130 and provider 135 each connect with content infrastructure 110 through a persistent and secure channel while monitoring incoming data intended for their client applications. In one embodiment, provider 130 and provider 135 connect over a binary interface that provides a high-speed, high-capacity interface, e.g., using a streaming TCP socket design in conjunction with binary content. The binary interface may be synchronous or asynchronous. For each interface, TLS (or SSL) may be used to establish a secured communications channel.

Mobile device 115, companion device 120, and user device 125 may be each embodiment as a single device, a single computer system, multiple devices, or multiple computer systems. In various aspects, mobile device 115, companion device 120, and user device 125 although labeled differently for convenience can each be embodied as a mobile device, a wearable device, or other mobile device (e.g., a laptop, palmtop, mobile phone, smart phone, multimedia phone, portable media player, GPS unit, mobile gaming systems, etc.). As examples, a wearable device can be a wrist worn device, a device that is clipped or pinned to the user's clothing, a device with a lanyard or chain that is wearable around the user's neck, a headband device, eyeglasses, or any other device that can be secured to the user's person or clothing.

In addition to or in the alternative, companion device 120 and user device 125 can be embodied as described above as well as being embodied as personal computer systems, mainframes, server computer systems, cloud services, or the like. Mobile device 115, companion device 120, and user device 125 may include a variety of technologies that provide a communications connection. Some examples of connection technologies include wired connections (e.g., Ethernet, fiber, digital subscriber line (DSL), etc.) and wireless connections (e.g., Wi-Fi, Bluetooth, WiMax, 3G, 4G, LTE, etc.).

In one aspect, mobile device 115, companion device 120, and user device 125 host one or more of a variety of client applications that communicate with one or more server applications provided by one or more providers (e.g., providers 130 and 135). These client applications may include applications specific to the intended function of a device (such as telephony applications or GPS applications) as well as e-mail clients, update/upgrade clients, news clients, web/blog clients, podcast clients, social networking clients, or other types of client applications where notification messages may be sent. These client applications may represent to a user one or more notification messages received using content infrastructure 110. Notifications can be represented to users in one or more manners defined by an operating system of the device, a graphical user interface toolkit, and/or the applications themselves. Some examples of representations of notifications include a new e-mail indicator, a new news item indicator, a new podcast indicator, a change of on-line status of a social networking friend, and the like. In various embodiments, another service operating on a device can handle notifications for client applications.

As discussed above, mobile device 115, companion device 120, and user device 125 may receive an identifier (or device token) when a client application initially connects with content infrastructure 110 in order to receive push notifications. Providers 130 and 135 can use the token, or include the token, with any content or notification message so that it can be appropriately forwarded back to the device using content infrastructure 110. In various embodiments, to ensure trust, a provider communicates the token every time it connects with content infrastructure 110. Content infrastructure 110 can decrypt the device token and validate using identity management infrastructure 105 that the token was generated for the destination device. To validate in one embodiment, content infrastructure 110 ensures that the device identifier contained in the token matches the device identifier in a device certificate used when the device registered with identity management infrastructure 105.

Referring to an operation of system 100 illustrated in FIG. 1, in one embodiment, the operation can be to forward or otherwise communicate a notification message from provider 130 to companion device 120 as illustrated by path 145. In various embodiments, provider 130 sends an authentication Secure Sockets Layer (SSL) certificate upon an initial connection with content infrastructure 110. Identity management infrastructure 105 can authenticate and authorize provider 130 as a registered and authorized sender of push notifications. This SSL certificate can also be configured with additional user-defined data. Identity management infrastructure 105 can utilizes the additional user-defined data to identify provider 130 in a trusted fashion. Other secure communications protocols (e.g., cryptographic protocols such as Transport Layer Security (TLS), etc.) can be used in other embodiments.

In some embodiments, where provider 130 is associated with a particular application (e.g., Email, Facebook, or Twitter) and includes additional identifying (e.g., user-defined) data within the SSL certificate, identity management infrastructure 105 can not only authenticate provider 130, but also automatically provision push service for provider 130 and the application utilizing content infrastructure 110. In other words, identity management infrastructure 105 can automatically extract any additional identifying data from the authentication certificate and have content infrastructure 110 attach the additional identifying data (or a portion of the data) to content (e.g., push-notification messages). In some embodiments, the additional identifying data may identify a topic or feed associated with provider 130 (or an application of provider 130) to which a user might subscribe via content infrastructure 110. Thus, the additional information in the authentication certificate can be leveraged to direct content to devices that have subscribed to the topic/feed or requested information regarding the topic/feed. In this way, push service is automatically provisioned for provider 130.

Once provider 130 is trusted, content infrastructure 110 receives the notification message from provider 130. As discussed above, the notification message may include a device token. Having received the notification message from provider 130, content infrastructure 110 determines the destination for the notification message. In various embodiments, the destination is determined based on the device token that is sent along with notification message. In some embodiments, it is not necessary to send destination information as part of a token. By determining or extracting the destination from the device token or otherwise obtaining destination information for the content, content infrastructure 110 can then determine whether the destination is "online" or otherwise accessible.

If the destination is online, in one embodiment, content infrastructure 110 may then route the notification message to the destination companion device 120 illustrated by path 150, for example, via a persistent connection maintained by companion device 120 with content infrastructure 110. If the destination is "offline" or otherwise inaccessible to content infrastructure 110, the content may be stored and delivery retried at a later time. Content infrastructure 110 can in addition to or alternatively route the notification message to mobile device 115 illustrated by path 155, for example, via a persistent connection maintained by companion device 120 with content infrastructure 110. Content infrastructure 110 thus can route content to a single device, multiple devices at the same time, or to one device for delivery to another device.

B. Content Infrastructure

Figure 2:
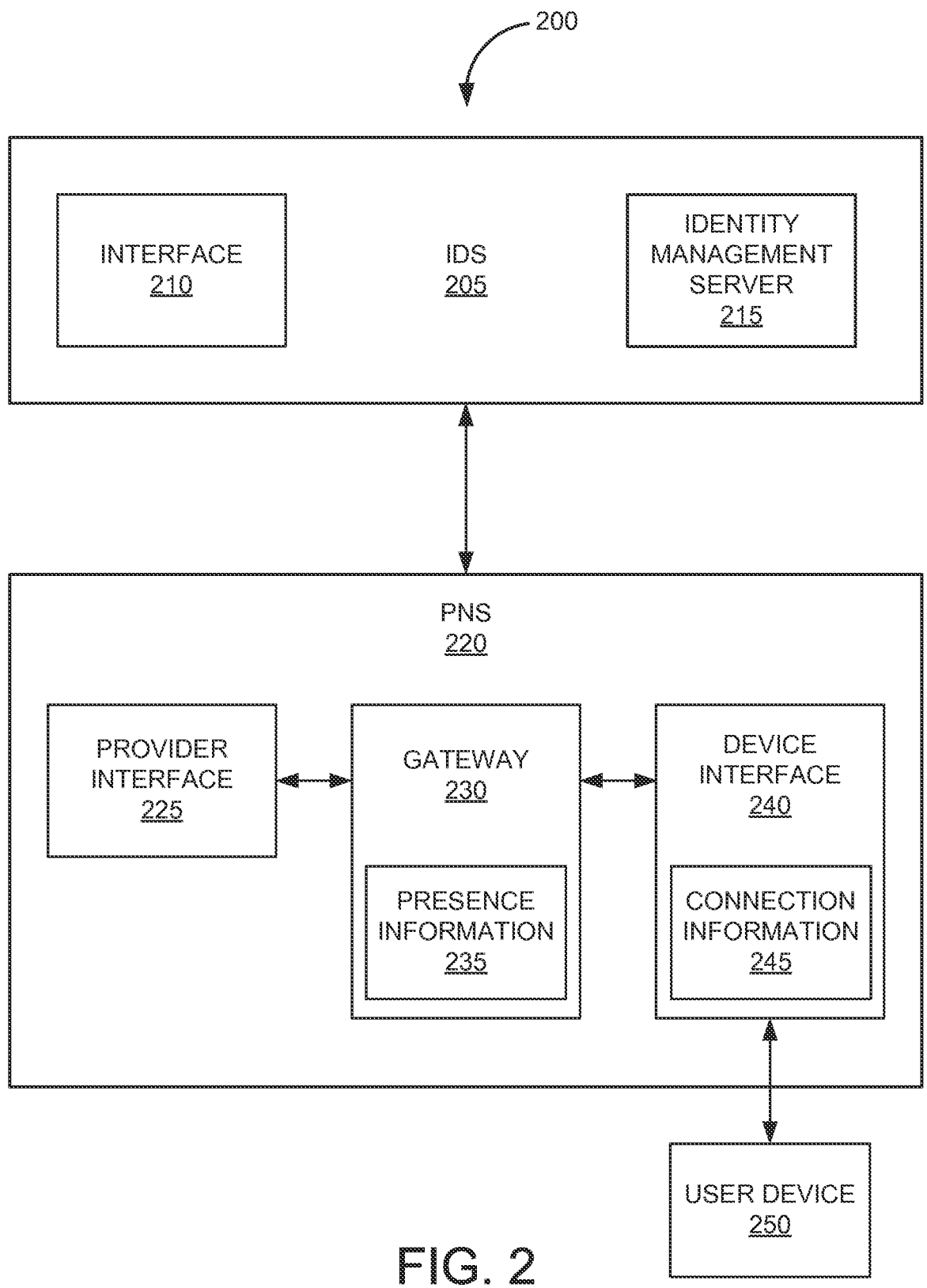
FIG. 2 is a block diagram of system that provides push notification services according to various embodiments.

FIG. 2 is a block diagram of system 200 that may use application-level acknowledgements with certain communications. In particular, IDS services as described herein, including IDS 205, may be used to facilitate discovery and communication between a devices that a party to a communication which may use application-level acknowledgements. In certain embodiments, different applications on a single device may be provided identifiers by IDS services. This may assist with various embodiments of communications between applications and associated application-level acknowledgements as described herein. System 200 can be embodied as content infrastructure of FIG. 1 in various embodiments.

In particular, FIG. 2 illustrates various examples of forwarding content (e.g., notification messages and phone/video calls) between devices, e.g., between providers and mobile devices, or between a sending device of one user and receiving devices of another user). In these examples, system 200 is shown with identity services (IDS) 205 having interface 210 and identity management server (IMS) 215 and push notification services (PNS) 220 having provider interface 225, gateway 230 having presence information 235, device interface 240 having connection information 245, and user device 250. Each service may be implemented using hardware and/or software elements.

In one aspect, IDS 205 may be embodied as or form part of identity management infrastructure 105. IDS 205 may be implemented in various embodiments using a single server computer system or may include multiple server computer systems, web servers, application servers, networks, interconnects, and the like. Interface 210 can enable an entity (e.g., mobile device 115 or provider 130) to connect (e.g., via a network) in order to take advantage of service provided by IDS 205. Interface 210 may incorporate load balancing and other connection management techniques allowing entities to communicate with Identity management server 215.

In one embodiment, an entity sends information such as an authentication certificate that is received via interface 210 upon an initial connection to IDS 205 or to a service, resource, or application managed by IDS 205 (e.g., PNS 220). Identity management server 215 can authenticate and authorize a device, user, or organization sending the information as a registered and authorized entity. One or more types of services can be authorized or provisioned for the device, user, or organization (e.g., call services, instant messaging services, chat services, notification services, etc.). To support a security model for PNS 220, entities and their devices may be required to possess certain certificates, certificate authority (CA) certificates, or tokens.

In one embodiment, each provider of content uses a unique provider certificate and private cryptographic key for validating their connection with PNS 220. This certificate can be provisioned by identity management server 215 and identify the provider and/or a particular topic published by the provider. In general, the topic is a bundle ID of a client application. The provider may optionally wish to validate the service, to which the provider is connected, using a public server certificate provided by PNS 220. In various aspects, the provider uses the public server certificate passed to it by identity management server 215 when registering to authenticate the service to which the provider has connected.

Identity management server 215 may also issue to each device, which desires to receive content, a unique private key and certificate that the device uses to authenticate itself to identity management server 215 and establish a connection to PNS 220. A device usually obtains a device certificate and key from identity management server 215 during device activation and stores them in a keychain. The device also holds its particular device token, which it receives during the service connection process. Each client application that utilizes PNS 220 is responsible for delivering this token to its content provider.

Identity management server 215 may store any necessary certificates, CA certificates, and cryptographic keys (private and public) for validating connections and the identities of providers and devices.

In this example, once the entity is trusted, system 200 allows the entity to utilize push notification services provided by PNS 220. PNS 220 may be implemented in various embodiments using a single server computer system or may include multiple server computer systems, web servers, application servers, networks, interconnects, and the like. The entity may be a provider or other notification provider desiring to connect with PNS 220 (e.g., via a network). As alluded to above, in one embodiment, provider interface 225 provides a high-speed, high-capacity interface allowing push notification providers to communicate with PNS 220. Provider interface 225 may incorporate load balancing and other connection management techniques allowing entities to communicate with PNS 220. Although provider interface 225 is shown as being linked to gateway 230, provider interface 225 may be incorporated into gateway 230 or device interface 240. As discussed above, a user device can be a provider of content in various embodiments as well as be a destination of content routed using PNS 220.

Gateway 230 may be implemented in various embodiments using a single server computer system or may include multiple server computer systems, web servers, application servers, networks, interconnects, and the like. Gateway 230 can determine the destination of content (e.g., push messages or call messages) received via provider interface 225 or device interface 240. In various embodiments, gateway 230 can determine a destination based on presence information 235. In one aspect, presence information 235 is maintained using a device's push token. Accordingly, when a push notification is received at gateway 230 directed to a particular push token, gateway 230 can perform a lookup to determine whether there is a TCP socket descriptor associated with that push token. The socket descriptor can provide the TCP socket information and other networking information needed to transmit the push notification. In various aspects, presence information 235 includes mappings between authenticated entities and their connections to PNS 220. These connections can be utilized by PNS 220 for delivering content, notifications, and the like or otherwise communicating with an entity. Each mapping may be indicative of at least one entity and at least one connection mechanism to that entity, such as a network socket connection or other connection identifier. For example, a mapping may identify a destination device by its device token or a provider by its provider identifier. Additional information may be included in each mapping in order to facilitate communication with the entity's device.

In some embodiments, in order to scale handling of connections from an increasing number of users, devices, and providers utilizing services of PNS 220, device connections in presence information 235 (or the devices themselves) may be managed according to at least one grouping or logical partition called a zone. Functions performed by gateway 230 may be partitioned out to multiple servers that are assigned dynamically to handle these groupings or zones. For example, one or more servers might manage, for a period of time, delivery to destinations assigned to one zone and then be switched, or reconfigured, to manage the delivery of notifications to destinations assigned to a different zone at a later time. Each of these servers may also include routing information that is used to route content to other servers associated with a particular zone of the destination of the content. Thus, when content is received at one server, another server designed to handle a predetermined zone is determined and the content can be forwarded to the appropriate server. In one aspect, functions performed by gateway 230 may be partitioned out to multiple servers to handle corresponding device connections (e.g., device interface 240).

In various embodiments, gateway 230 is linked to device interface 240. Device interface 240 provides an interface to communicate with user device 250. Device interface 240 may incorporate load balancing and other connection management techniques allowing devices to communicate with PNS 220. Although device interface 240 is shown as being linked to gateway 230, device interface 240 may be incorporated into gateway 230 or provider interface 225.

Device interface 240 in these examples allows presence information 235 to be generated when device interface 240 is connected to user device 250. User device 250 can assert its presence to PNS 220 upon establishing a persistent connection. Device interface 240 then generates a device/connection mapping in connection information 245. Device interface 240 can back-propagate connection information 245 to gateway 230 allowing gateway 230 to generate a device/connection mapping in presence information 235. In one aspect, presence information 235 includes a device/courier mapping or link allowing gateway 230 to determine an appropriate courier that acts as device interface 240 connected to user device 250. The courier utilizes connection information 245 (including any device/connection mappings or links) allowing the courier to determine connection information specific to user device 250 that can be used to deliver content to user device 250. In another aspect, presence information 235 and connection information 245 may be substantially identical in that they include correspondences between a given device and its connection with PNS 220.

In various embodiments, a device wishing to receive content via PNS 220 sends authentication information either upon an initial connection with device interface 240 or directly to IDS 205. Identity management server 215 can receive the authentication information either directly or indirectly and then authenticate and authorize the device or its associated user or organization as a registered and authorized entity. Once the device is trusted, PNS 220 is informed and PNS 220 thereafter manages any connections made between the device and PNS 220 (such as with device interface 240 in connection information 245). Device information available at device interface 240 in connection information 245 can be periodically back-propagated to gateway 230 to generate or update presence information 235.

When the device initially connects with PNS 220, PNS 220 provisions the device. In various embodiments, a zone is provisioned for the device as alluded to above. Despite a particular zone assignment for each device, devices may lose their connection with device interface 240 for various reasons. For example, a connection might be lost due to loss of cellular signal, or Wi-Fi signal, loss of power, or because a mobile device has changed geographic locations, etc. In other aspects, a connection may be intermitted as opposed to being persistent in order to conserve power or achieve other efficiency metrics.

When user device 250 attempts to reconnect to PNS 220, user device 250 can connect with any courier acting as device interface 240. In embodiments where device connections are assigned to at least one grouping or zone, device interface 240 may provision a connection with one or more servers of gateway 230 that are assigned to handle the zone of a connecting device. For example, if device interface 240 is connected to user device 250 that is assigned to zone 1, then device interface 240 can provision a connection with one or more servers responsible for managing zone 1. Device interface 240 may then back-propagate device information for user device 250 to the one or more servers responsible for managing zone 1. In similar fashion, device interface 240 may make connections with servers of different zones to back-propagate specific device information for devices associated with those respective zones ensuring that no matter where or how user device 250 connects to PNS 220, presence information 235 is up to date and available to determining how to route the content. In some embodiments, device interface 240 can be specific to a wireless carrier or internet service provider (ISP) allowing PNS 220 to support the protocols or physical connections specific to multiple third party entities.

According to one example, when gateway 230 receives content from provider interface 225, gateway 230 forwards the content received from provider interface 225 to device interface 240 based on its mappings in presence information 235. Device interface 240 can deliver the content received from gateway 230 to user device 250 for which information about a persistent connection is maintained in connection information 245.

Upon receiving content from gateway 230, device interface 240 can perform a lookup or otherwise consult its device connections in connection information 245 and send the content received from gateway 230 to the appropriate device, for example, over the persistent connection associated with user device 250. In one aspect, device interface 240 inspects the device token associated with the content to be delivered and determines whether a match is found between the device token and the connections that device interface 240 manages in connection information 245. Device interface 240 can deliver the content using the connection established by the device having the given device token.

In one example of operation, user device 250 subscribes to a particular application managed by a provider and desires to receive notification messages for that application via PNS 220. Thus, user device 250 calls the provider either directly via a communications network or utilizing PNS 220 and transmits its device token to the provider. The device token or its transmission may include not only a device's identification information but may include an encrypted combination of a device's UID and its zone identifier allowing PNS 220 to provision connection information for the device according to the appropriate resources allocated to the zone.

When the provider sends a notification message to the particular application on user device 250, the provider connects to PNS 220 using provider interface 225 and sends the message to gateway 230. Even if user device 250 is associated with a particular zone, the provider does not need to connect to any particular gateway of PNS 220 to successfully push a notification message to user device 250. For example, if gateway 230 receives content from provider interface 225 and the content has a device token, gateway 230 will look at the token and either route the message to an appropriate server of PNS 220 (which may route the message to device interface 240 or another courier of PNS 230) or route the message directly to device interface 240.

If gateway 230 is the designated gateway, gateway 230 sends/forwards the message to device interface 240 based on its device/courier mapping in presence information 235 in some embodiments. Device interface 240 is then able to lookup its connections in connection information 245 and send the message to the device over the persistent connection established by the device with device interface 240. In summary, in cases where PNS 220 receives a message having a particular destination, a gateway of PNS 220 forwards that message directly to an appropriate courier of PNS 220 using a device/courier mapping that was established when a device connects to PNS 220. In further embodiments, gateway 230 can send/forward the message directly to user device 250 based on its device/connection mapping in presence information 235. Gateway 230 can generated this mapping information from various sources to each of which a device has established a connection.

II. Application-Level Acknowledgements

A. System and Device Embodiment

Figure 3:
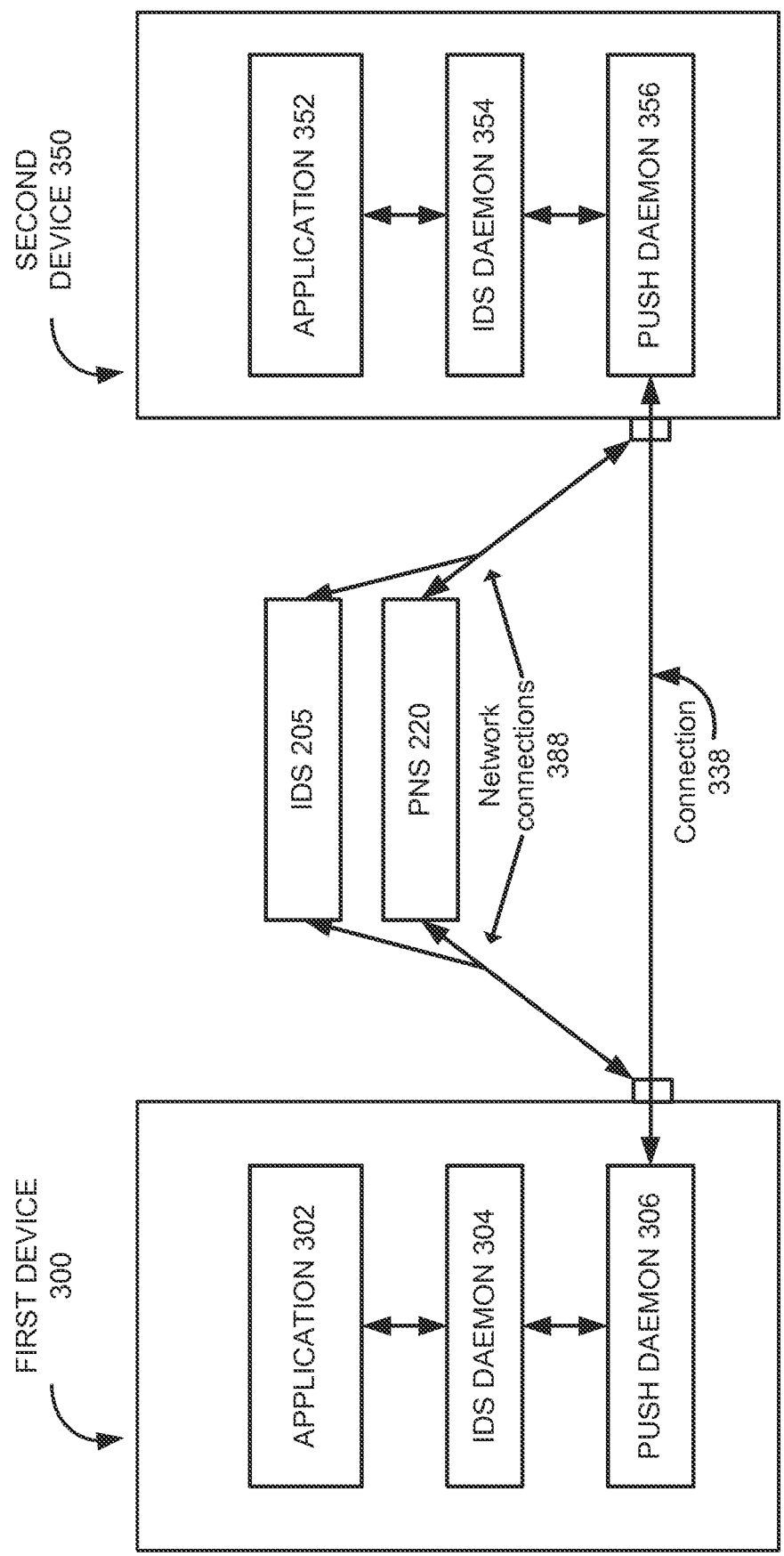
FIG. 3 is a diagram of first and second devices that may use application-level acknowledgements in communication with one another according to various embodiments.

FIG. 3 is a diagram of first and second devices that may use application-level acknowledgements in communication with one another according to various embodiments. FIG. 3 includes first device 300, second device 350, IDS 205, and PNS 220. These devices may be connected by network connections 388 and connection 338.

Devices 300 and 350 may be any device accessible by a network interface, including a desktop computer, a laptop computer, a smartphone, a tablet computer, a wearable device (e.g. a network enabled watch, earpiece, or necklace,) a networked appliance (e.g. a network enabled refrigerator or clothes washer,) media player, personal digital assistant, key fob, access card, multi-function device, game system, or any other such client device. An device, client device, mobile device, host device, or any other such device described herein will include processing resources, memory resources, and networking resources. One embodiment of a device illustrating such resources is shown and described with respect to FIG. 7, though it will be apparent that other structures for a device may be possible according to different embodiments.

Different embodiments may implement connection 338, network connections 388, or aspects of these connections using one or more communication protocols or technologies, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, Wi-Fi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), synchronous optical network (SONET), Ethernet (IEEE 802.3), or any other suitable communication protocol, including communication protocols not yet developed as of the filing date of this document. A host or client device can include wireless circuitry as part of wireless interfaces, such as network interface 312, network interface 362, and wireless interface 364, that can communicate over several different types of wireless networks depending on the range required for the communication. For example, a short-range wireless transceiver (e.g., Bluetooth), a medium-range wireless transceiver (e.g., Wi- Fi), and/or a long range wireless transceiver (e.g., GSM/GPRS, UMTS, CDMA2000 1x/EV-DO and LTE/LTE-Advanced) can be used depending on the type of communication or the range of the communication.

Connection 338 in particular may, in certain embodiments be implemented as a peer to peer (P2P) wireless connection directly between network interface 312 and network interface 362. In other embodiments, connection 338 may include multiple additional devices and sub-connections, including multiple access points, network routing connections, and communication servers.

In additional alternative embodiments, connection 388 may function as the sole connection between first device 300 and second device 350, with IDS 205 and/or PNS 220 functioning as a communication path for first device and second device 350 to communicate with each other. In such embodiments, IDS 205 or PNS 220 may operate as a proxy, and may then store portions of communications between the devices and retransmit or relay communications and acknowledgements if needed.

Wireless circuitry may be used in conjunction with wireless interfaces such as wireless implementations of network interfaces 312 or 362 to send and receive information over wireless connections such as connections 338 and 388. Any device described herein may additionally include conventional circuitry such as an antenna system, an RF transceiver, one or more amplifiers, a tuner, one or more oscillators, a digital signal processor, a CODEC chipset, memory, etc. to enable various wireless connections as described herein.

Circuitry of network interfaces 312 and 362 may be coupled to processing resources of their respective devices. Data packets received by circuitry of an interface may be sent to one or more processors via peripheral interfaces. The processing resources of first device 300 may be used to implement client device processes such as application 302, IDS daemon 304, and push daemon 306. Similarly, processing resources of second device 350 may be used to implement device processes such as application 352, IDS daemon 304, and push daemon 306.

A daemon as described herein is a process that may be implemented in hardware, firmware, or software on a computing device. A daemon runs as a background process rather than being under the direct control of a user.

IDS daemon 304 may function as a service operating on first device 300 to work with IDS 205 to provide device identities for use in communication processes. Any service described above for IDS 205 may function, in part, using IDS daemon 304 to implement local aspects of identity services for device 300. In certain embodiments, for example, IDS daemon 304 may communicate with IDS 205 via network interface 312 to receive a second device identity with is associated with second device 350. This may enable addressing for communications from first device 300 to second device 350 that use application-level acknowledgements. IDS daemon 354 may provide similar functionality for second device 350.

Also similarly, push daemon 306 may function as a service operating on first device 300 to work with PNS 220 to provide push services for use in communication processes. Any service described above for PNS 220 to provide push functionality may, in part, function using push daemon 306 to implement local aspects of push services for device 300. In certain embodiments, push daemon 306 may receive communications from PNS 220 identifying connections with second device 350 that may be used for transmission of data packets with multiple different types of acknowledgements.

IDS daemon 304, push daemon 306, IDS 205, PNS 220, IDS daemon 354, and push daemon 356 may, in certain embodiments, all be considered aspects of a communication management system including communication management processes that assist in communications between application 302 of first device 300 and application 352 of second device 350. For example, in certain embodiments, IDS daemon 304 may work with IDS 205 to identify second device 350 as a correct and secure target for a communication from first device 300. IDS daemon 304 and push daemon 306 may then work together to communicate one or more data packets as part of the communication from network interface 312 to network interface 362. This may be done with TCP packets where the communication between network interface 312 and network interface 362 includes TCP acknowledgements.

When a data packet is accepted by push daemon 356 or IDS daemon 354, these management processes may communicate an acknowledgement identifying receipt of the communication either to the management processes of first device 300, to IDS 205, to PNS 220, or to any combination of these. The data packet may then be passed by the management process of second device 350 to application 352. The data packet may include an application identifier that identifies application 352 as the appropriate application to process the data packet. For example, a header of the data packet can specify a port that corresponds to application 352.

When application 352 finished processing the data packet, the management processes of second device 350 may identify or receive notice of this, and then communicate an additional acknowledgement which indicates that the data packet has been processed by application 352. While this process is described here as associated with a data packet, any message, file, or other unit of data may have a similar application-level acknowledgement applied by the management processes described herein.

B. Sequence Diagram

Figure 4:
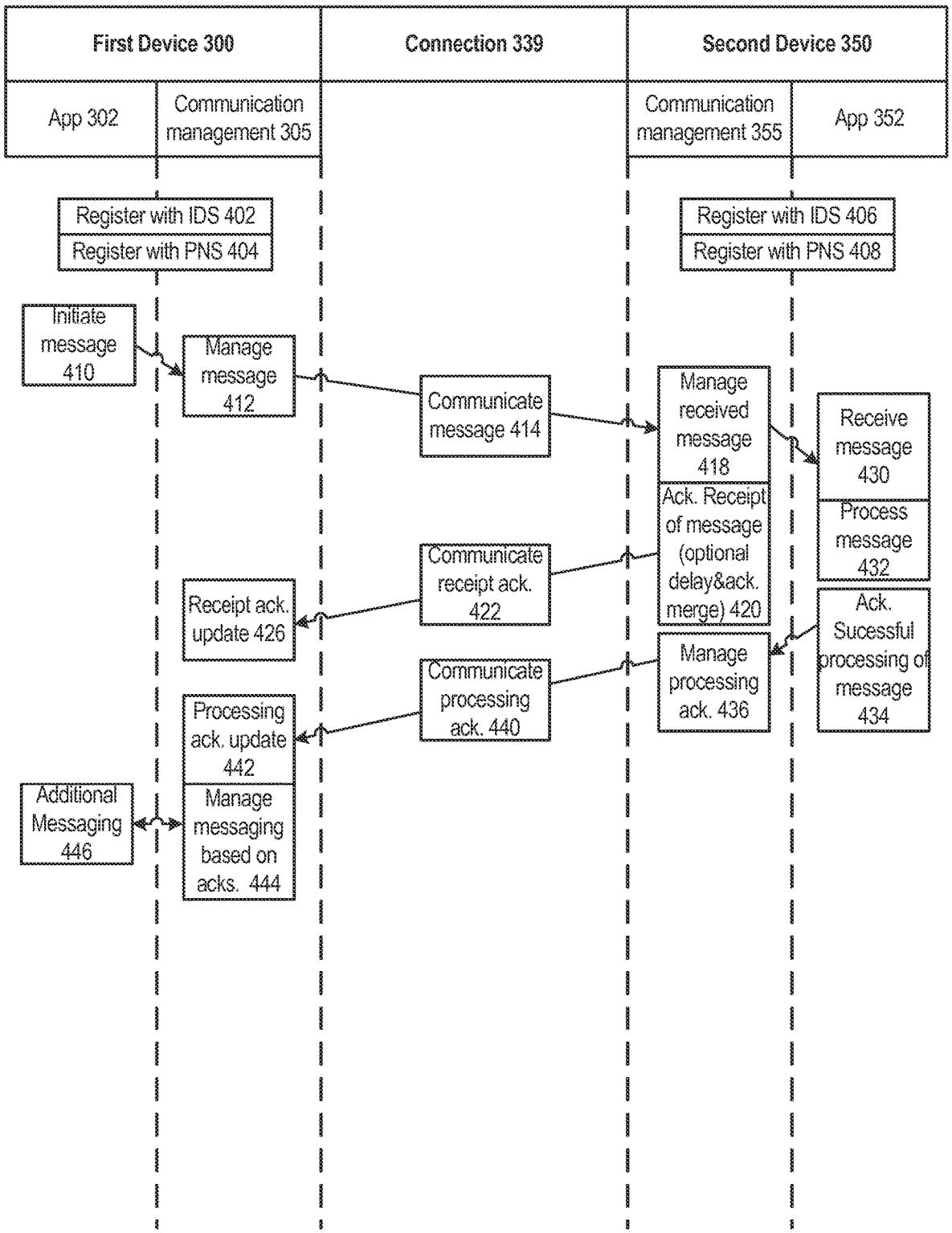
FIG. 4 illustrates a signal flow for application-level acknowledgements according to various embodiments.

FIG. 4 illustrates a signal flow for application-level acknowledgements according to various embodiments. The sequence shows a communication from first device 300 to second device 350 across connection 339. In various embodiments, connection 339 may comprise connection 338, connections 388, IDS 205, PNS 220, or any other such elements of a possible connection between devices. First device 300 executes application 302 and communication management 305, which may comprise IDS daemon 304 and push daemon 306, or may comprise additional modules or merged versions of such modules. Second device 350 similarly includes communication management 355 and application 352.

In blocks 402, 404, 406, and 408, first device 300 and second device 350 may each register with an identity management system and a push notification system such as those described above with respect to FIG. 1 and FIG. 2. This may provide the devices with unique identifiers and associate the devices with an identity or account. As part of such a registration and association, the devices may store unique identifiers for devices sharing an identity locally, that enables the host device to locate client devices without the need to access an IDS server prior to initiating a communication. In various embodiments, registration may be renewed or updated periodically or based on various triggers such as system updates or alerts pushed from the systems.

In block 410, application 302 may initiate a message directed to application 352. Such a message may comprise a data packet, a data stream, a file, multiple files, or any other such message. In block 412, communication management 305 manages the message by, for example, identifying an address and a secure identity associated with the second device 350. In certain embodiments, this may involve determining that first device 300 and second device 350 are each associated with a single account as identified by an identity management server, and that the devices are authorized to share the information in a payload of the message.

In block 414, the message is communicated via connection 339 to second device 350. In certain embodiments, this may be a peer to peer (P2P) wireless transmission directly between the wireless interfaces of first device 300 and second device 350. In other embodiments, this may be a complex network connection involving multiple routers and access points. In still further embodiments, this may involve a connection with an IDS server computer such as IDS 205 or a PNS network server such as PNS 220 acting as a proxy. Further, this communication of block 414 may itself involve acknowledgements, such as standard TCP acknowledgements.

In block 418, communication management 355 of second device 350 receives the message and manages a response to receiving the message. This may include initiating a receipt response and initiating a passing of the message to the appropriate application. In block 420, a receipt acknowledgement is created and sent which is a communication management level operation acknowledging that communication management 355 has ingested the message. In block 422, this receipt acknowledgement is communicated back and in block 426, the receipt acknowledgement is received and processed by communication management 305 of first device 300. This may then result in additional communications, or this information may be stored while the system waits for additional acknowledgements.

In block 430, application 352 receives the message from communication management. 355. The message is processed in block 432. This processing may involve storing the message for later use, performing calculations based on the message, initiating another process that is ongoing based on the message, or any other such complete or partial disposition of the message.

In block 434, application 352 may perform an action that acknowledges successful processing of the message. This response may be considered an application-level acknowledgement made by application 352. This may involve a process of application 352 returning a focus, processing thread, or polling action to communication management 355. For example, a process that checks communication management for messages for application 352 may perform such a check after successful processing of the previously received message. Application 352 may communicate an affirmative message to communication management 355 regarding the status of the message. Any such status of application 352 may be observed and used as an acknowledgement that the message was successfully processed.

In block 436, communication management 355 may either accept a processing acknowledgement message or may observe an indication and use the indication to create a processing acknowledgement message. In block 440, the processing acknowledgement is communicated across connection 339 and is then used in block 442 to update communication management 305. In block 444, the receipt of one or more acknowledgements may then be managed, and used to determine if additional messaging will follow in block 446.

As described above for block 414, in various embodiments, the communication of acknowledgements in blocks 442 and 440 may use any possible connection such as be a peer to peer (P2P) wireless transmission directly between the wireless interfaces of first device 300 and second device 350, a complex network connection involving multiple routers and access points, or a connection with an IDS server computer such as IDS 205 or a PNS network server such as PNS 220 acting as a proxy. These acknowledgement communications may each involve additional acknowledgements, such as standard TCP acknowledgements. Further, the particular path followed by the message in block 414 may be different than the path followed by the receipt acknowledgement in block 422 or the processing acknowledgement in block 440.

As shown, the receipt acknowledgement of block 420 is communicated separately from the processing acknowledgement of block 436. In alternative embodiments, block 420 may involve a delay to determine if the message will be processed within a predetermined period. For example, a one second delay may be implemented. This use of such a delay may be performed based on a user setting, based on a power or battery level of the second device 350, based on the type of message at issue or a value within the message, or based on any other such criteria. If the processing acknowledgement is then created within the delay period, the receipt acknowledgement and the processing acknowledgement may be sent as part of the same communication. A field value or flag may be set in such a combined acknowledgement to allow communication management 305 to identify that the two acknowledgements were merged, the process may continue with decision making as if two separate acknowledgements had been received.

C. Sending Side Embodiment

Figure 5:
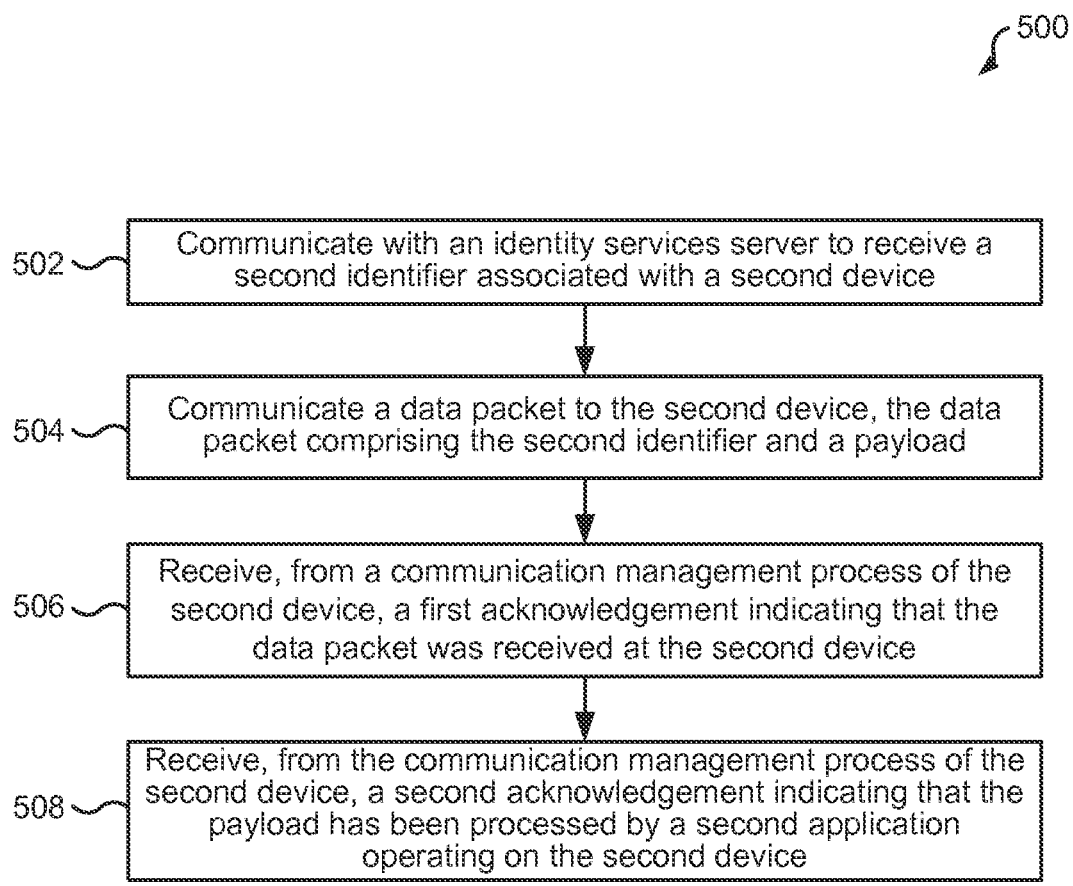
FIG. 5 illustrates a method by a sending device for application-level acknowledgements according to various embodiments

FIG. 5 illustrates a method 500 by a sending device for application-level acknowledgements according to various embodiments. The first device performing such a method may be any device comprising wireless circuitry, a memory, and a processor such as first device 300, second device 350, or mobile device 900 described below.

At block 502, the first device communicates, via wireless circuitry, with an identity services server to receive a second identifier associated with a second device. As described above, such a communication may be based on information received from the application, information of an identity services daemon operating on the first device, or in any other such fashion. This communication may additionally identify the second device as a target for a communication including a payload from the application. This communication may be performed using the same network interface or communication protocol as other, later communications in this method, or may be performed using a different network interface or communication protocol.

At block 504, the first device communicates a data packet to the second device via the wireless circuitry. The data packet comprises the second identifier and a payload. The payload may include data, metadata, addressing information, or any other such information associated with a communication. This may further involves files or data for a synchronization process, a file transfer process, a remote control process, a video streaming process, a remote display process, or any other such process. This communication may be performed by a communication management process working alone or in conjunction with an identity services server and/or a push notification server. Such a communication management process may be an identity services daemon, a push notification services daemon, a combination of the two, or any other such device process for assisting with communications that operates on the first device.

At block 506, the first device receives, from a communication management process of the second device, a first acknowledgement indicating that the data packet was received at the second device. Such a communication management process of the second device may also be an identity services daemon, a push notification services daemon, a combination of the two, or any other such device process for assisting with communications.

At block 508, the first device receives, from the communication management process of the second device, a second acknowledgement indicating that the payload has been processed by a second application operating on the second device. As part of this receiving, and as part of any communication process listed above, additional acknowledgements may be sent and received as part of controls associated with different communication layers than those associated with the first acknowledgement and the second acknowledgement. An example of such an additional acknowledgement may be TCP acknowledgements.

As communication as illustrated by FIG. 5 may include at least three different types of acknowledgements within a single communication process, with at least one of the acknowledgements associated with completion of an application process that is separate from the communication process. Such an application process separate from the communication process may involve an application storing a data packet, an application performing a calculation using a data packet, an application presenting information from a data packet to a user via a display, or any other such application initiated process that is separate from the process of communicating the data packet between devices or providing the data packet to an application for initial processing.

D. Receiving Side Embodiment

Figure 6:
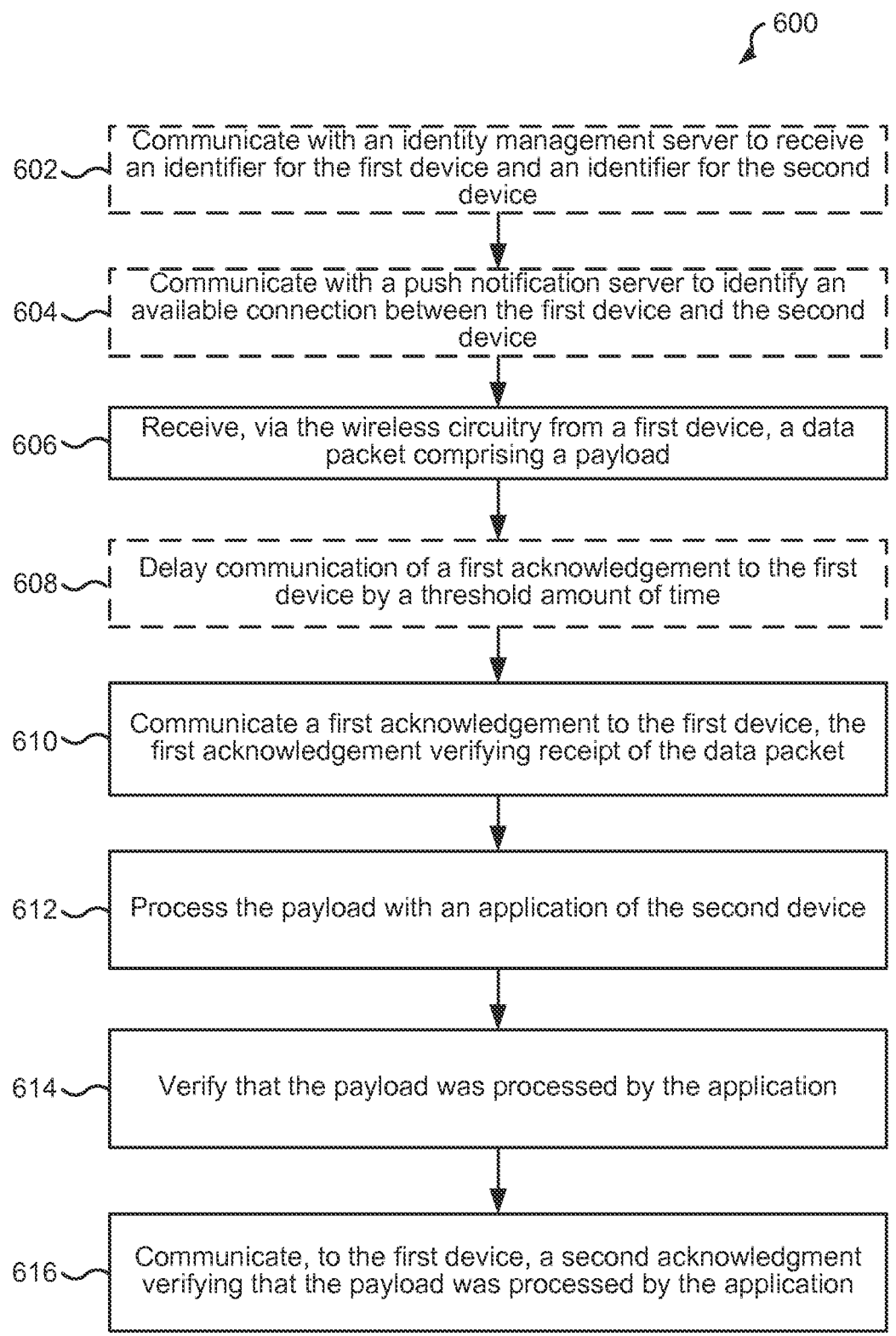
FIG. 6 illustrates a method by a receiving device for application-level acknowledgements according to various embodiments.

FIG. 6 illustrates a method 600 by a receiving device for application-level acknowledgements according to various embodiments. Method 600 can implement application-level acknowledgements similar to what is described for method 500, but presented from a receiving device instead of a transmitting device. For ease of illustration, the receiving device is labeled as a second device, where the first device is the sending device, as for method 500.

At block 602, the second device optionally communicates (e.g., using an identity services daemon of the second device) with an identity management server to receive an identifier for a first device and an identifier for a second device. Such identifiers may be used for any aspect of communication or security to determine whether devices are authorized to communicate with each other.

At block 604, the second device optionally communicates e.g., using a push daemon) with a push notification server to identify an available connection between the first device and the second device. In embodiments where such actions are performed, they may be performed far in advance of any subsequent communication, with information derived from these communications stored for later use. In certain embodiments, these communications with service servers may be triggered by a communication failure during a previous attempt for devices to communicate. This may be true for both sending and receiving devices in any communication as described herein.

At block 606, the second device receives, via the wireless circuitry from a first device, a data packet comprising a payload. As described above, in certain embodiments, such communications may be performed by a connection with an IDS server or a PNS server acting as a proxy. In certain embodiments, this receipt may be of a retransmission from such an IDS server or a PNS server, where an earlier transmission was either lost on a poor quality connection, or lost by the receiving device prior to an application acknowledgement being sent. Thus, in certain embodiments, a sending device may send a data packet.

An IDS or PNS server may relay the data packet, and the IDS or PNS server may then retransmit the data packet independent of any communication with the sending device. Such a retransmission may, in certain embodiments, be triggered by the IDS or PNS server failing to receive a push acknowledgement, a receipt acknowledgement, an processed acknowledgement, or another acknowledgement from an application disposing of the originally transmitted data packet.

At block 608, the second device delays communication of a first acknowledgement to the first device by a threshold amount of time. This may enable conservation of power by consolidating two acknowledgements into one if the application finishes processing the data packet quickly. This may also enable errors or other actively identified problems to be consolidated with a first acknowledgement if such errors are identified and returned to a communication management process quickly. In certain embodiments, the delay time or the use of any delay may be variable based on power levels of a battery, based on user settings, or based on any other such options.

At block 610, the second device communicates a first acknowledgement to the first device. The first acknowledgement verifies receipt of the data packet. For example, a push daemon (e.g., 356 of FIG. 3), IDS daemon (e.g., 354), or any communication management processes can send the first acknowledgement to the first device. The communication of the first acknowledgement can occur as described herein, e.g., directly to the first device or via a server.

At block 612, an application of the second device processes the payload. For example, application 352 in FIG. 3 can process the payload. The application for processing can be designated by an identifier (e.g., a port in a header) in the data packet.

At block 614, the second device verifies that the payload was processed by the application. In one embodiment, the application can send a message indicating that the payload was processed. The application can include a link to a library function for verifying the processing, where the library function can be part of the operating system. An IDS daemon or other communication management process can receive the message from the application.

At block 616, the second device communicates, to the first device, a second acknowledgment verifying that the payload was processed by the application. The second acknowledgment can be sent in a similar manner as the first acknowledgment.

During the processes described in either FIG. 5 or FIG. 6, any number of other communication processes may be occurring simultaneously, with various memory buffers or other systems for managing the communications. As such, certain embodiments may include a memory stack comprising any number of data packets, with an application process accepting one or more data packets at a time, and returning to the stack after the previously retrieved data packets are disposed of by the process. Any aspect of such a process, such as an application retrieving a data packet, may be used as a trigger to create an acknowledgement that a previous data packet has been disposed of Additionally, a single device may simultaneously be performing both sending and receiving processes, so that a device may be communicating a data packet and expecting an application-level acknowledgement to the data packet, while at the same time sending an application-level acknowledgement. Further, these processes may be occurring with more than two devices at a time, such that a single device may be communicating application-level acknowledgement to multiple devices while at the same time receiving application-level acknowledgements from multiple devices different from the multiple devices it is communicating to.

III. Protocol Stack

Figure 7:
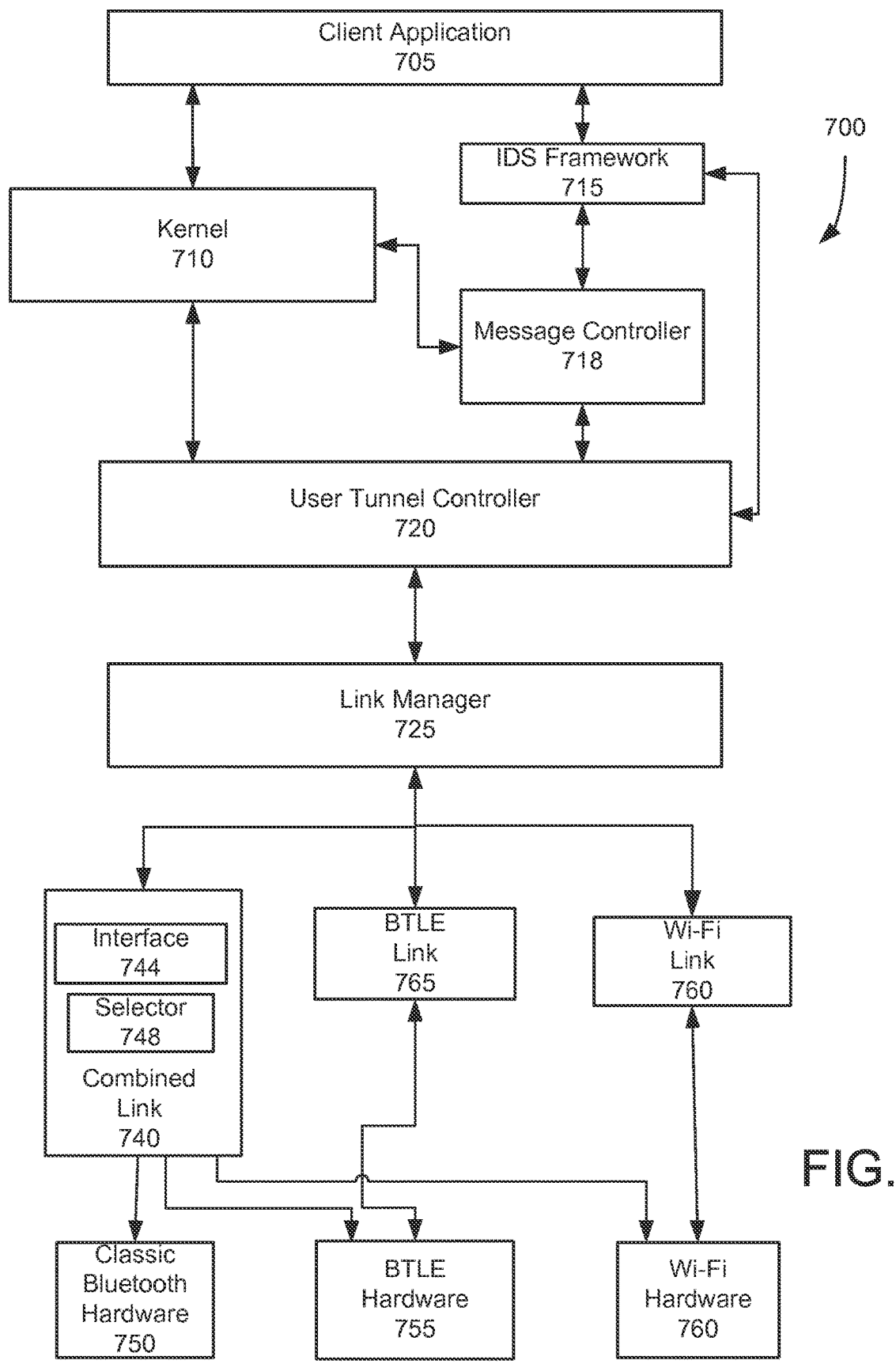
FIG. 7 shows a protocol stack for communicating data according to embodiments of the present invention.

FIG. 7 shows a protocol stack 700 for communicating data according to embodiments of the present invention. In various embodiments, the protocol stack 700 may be implemented as part of first device 300 of FIG. 3, as mobile device 900 of FIG. 9, or as part of any other device described herein. In certain embodiments, the protocol stack 700 may be used to manage retransmission priority either in whole or in part. Various modules in protocol stack 700 can be omitted, or other modules added. The software modules can be run on a same processor or different processors. Although only a few communication protocols are listed, numerous wireless protocols can be used. For example, Bluetooth protocols can include Basic Rate (BR), Enhanced Data Rate (EDR), and Low Energy (LE) options. Bluetooth BR/EDR is also referred to as Classic Bluetooth.

The communication of data from a device (e.g., mobile device 115, companion device 120, first device 300, or second device 350) can occur through various protocols (e.g., 802.11 protocols, Bluetooth protocols, and near field communication (NFC) protocols). To determine which protocol to use, a device can include a link manager for determining which protocol to use for a particular application, and thus which driver path data should be sent. A lower level link layer can also perform selections of a particular protocol to use. Further, a user tunnel (UTUN) controller can coordinate a plurality of virtual connections with various client applications to communicate over a common socket connection with another device (e.g., mobile device 115 communicating with companion device 120).

In some embodiments, a client application 705 on the device (e.g., mobile device 115) can request data to be sent to another device (e.g., companion device 120). The request can specify the other device via any suitable identifier, e.g., an account name, an IP address, a MAC address, etc. The request can be before or after the device determines that the other device is within communication, e.g., as determined by initial signaling, such as a handshake. The data (e.g., in a message or a stream) can be sent any suitable application layer protocol, such as HTTP, RTP, SMTP, MGCP, etc. The other device can be any device, including another device of the user. The request can made be in response to an action by the user, an internal event (e.g., based on time or other criteria) that may be in a same or other application (e.g., a calendar app), or an external event (e.g., in response to a message from another device). An example of an event is a syncing event.

Before sending data, client application 705 can submit an open socket request (e.g., in a streaming example). The socket request can use information from an identity services (IDS) framework 715, which can provide an address (or other type of ID) for the other device. For example, client application 705 can know account information for the second device (e.g., account information of a different or same user), and IDS framework 715 can store a list of device IDs for a particular account. IDS framework 715 can be in communication with identity management infrastructure 105 to obtain the list. Thus, IDS framework 715 can store or otherwise obtain device IDs (e.g., addresses) for all devices that a user has registered with ID infrastructure 105. For example, IDS framework 715 can request via an IDS daemon to ID infrastructure 105 to obtain the device IDs. In one implementation, the socket request can be made to kernel 710.

In a messaging example, the request to send data can go to IDS framework 715 to obtain a device ID, which can be sent to message a message controller 718 and a user tunnel (UTUN controller 720. UTUN controller can establish a mapping between the device ID and an IP address (e.g., a virtual IP address) when the device ID is not an IP address. A socket can be created between message controller 718 (which assigns a device ID to the socket) and kernel 710 (which can assigns an address to the socket, such as a virtual IP address). UTUN controller can be used to create the socket connection between message controller 718 and kernel 710. In this manner, the send-date request from client application 705 does not need to include a device ID, but can specify an account, which can then be cross-referenced by IDS framework 715 with known devices of the account and their capabilities (e.g., if the request requires certain capabilities). Given that a device ID can be obtained, a pairing does not need to occur prior to creating the socket.

In various embodiments, IDS framework 715 can receive a particular port/service at the other device from client application 705, determine the port/service based on information obtained from ID infrastructure 105, or determine the port/service from a token sent in the request. IDS framework 715 can then communicate a device ID and other header information to message controller 718 and/or UTUN controller 720. IDS framework 715 and UTUN controller 720 can communicate via cross process communication (XPC). UTUN controller 720 can be part of an IDS daemon, and can receive a device ID from ID infrastructure 105.

As mentioned above, UTUN controller 720 can create a virtual address that corresponds to the actual device address, where the virtual address can be used to create a virtual socket. A virtual socket can also be created using any device ID (e.g., an actual address of a device or other ID). As an example, a socket can be created for communication between client application 705 and kernel 710 (e.g., in a streaming context), where kernel 710 can have various sockets open with various client applications. Kernel 710 can have a single connection to UTUN controller 720 for the other device and multiplex (mux) the data from various client applications into the single connection. Instead or in addition, UTUN controller 720 can also perform the muxing, e.g., if multiple socket exist between kernel 710 and UTUN controller 720 for various client applications to the other device. Incoming data can be demultiplexed (demuxed) for sending to the destination client application.

As another example, a socket can be created between kernel 710 and message controller 718 (e.g., in a messaging context), where a socket can be created for each destination device, with different sockets to a same device potentially having different priorities. Thus, a particular virtual socket can be associated with a particular device and a particular priority (e.g., high and low). Message controller 718 can have various connections to various client applications. Thus, message controller 718 can provide mux/demux capabilities.

UTUN controller can create a primary socket with the other device. When UTUN controller 720 receives data using a virtual connection associated with the second device, it can then map the virtual connection to the primary socket for communicating with the other device. All data for the other device can then be sent out through the primary socket.

The virtual address for a virtual socket can be passed back to client application 705, e.g., in the stream context. In one embodiment, a virtual socket involving kernel 710 is a TCP socket. The virtual address can have a same format as a regular address, e.g., an IPv6 address. A mux module can include any combination of kernel 710, message controller 718, and UTUN controller 720.

When client application sends data, client application 705 can use the virtual socket to send data to kernel 710. For example, the data can be sent using TCP via the virtual socket. Kernel 710 can implement an UTUN interface for communicating with UTUN controller 720. Kernel 710 would pass the data (e.g., with a TCP header) and the virtual socket identifying the virtual address to UTUN controller 720, which would then use the virtual address to resolve the device address for determining the device socket.

When sending to the data over the device socket, a link manager 725 can determine which link to use. A link can be a particular combination of a wireless interface protocol (e.g., Bluetooth or Wi-Fi), a transport protocol (e.g., TCP, UDP, etc.), and a destination device. In this manner, UTUN controller 720 does not need to know how the data is being sent, but instead can simply send the data to link manager 725.

In various embodiments, the determination by link manger 725 can be made per data packet, per set of data packets, per device socket, and may change from one data packet to another. Link manager 725 may then select a link for sending the data. In the example shown, a Wi-Fi link 730 provides software drivers for communicating with one or more Wi-Fi protocols, and BLTE link 735 provides software drivers for communicating with Blutooth LE. Wi-Fi link 730 is in communication with Wi-Fi hardware 760, and BLTE link 735 is in communication with BTLE hardware 755. Wi-Fi link 730 can be used for various Wi-Fi protocols, such as infra-Wi-Fi (infrastructure Wi-Fi). In one embodiment, link manager 725 can try all links to determine whether any of the links can contact the other device, and then use a connected link with a highest predetermined rank or dynamic rank.

Hardware 750-760 can be in communication with links assigned to various devices. For example, links 730, 735, and 740 can be assigned for communication with a second device. And, other links that are assigned for communication with a third device can also be in communication with hardware 750-760. When a particular hardware receives data, software can identify a particular sending device and then determine the corresponding link, e.g., using header information to determine the link corresponding to the sending device and transport protocol.

In some embodiments, a combined link 740 can include an interface 744 for communicating with link manager 724 and a selector 748 that selects a particular protocol to use. The protocols can be the same or different than that available to link manager 725. Selector 748 can perform similar functions as link manager 725 in that a particular link is selected. However, link manager 725 and selector 748 can use different criteria for determining which link to use. For example, link manager 725 can determine to use combined link 740, and selector 748 can then determine that BTLE hardware 755 is to be used. The hardware can be contained on a same or separate chips.

One or more protocols can be only available via combined link 740, such as classic Bluetooth hardware 750. Link manager 725 and selector 748 can use various criteria for determining which link to use, such as power usage of a link, speed of a link (e.g., real-time data rate), and signal strength of a link. A goal of the optimization for selecting a link can be to provide a minimal data rate at a lowest possible energy.

IV. Mobile Device

Figure 8:
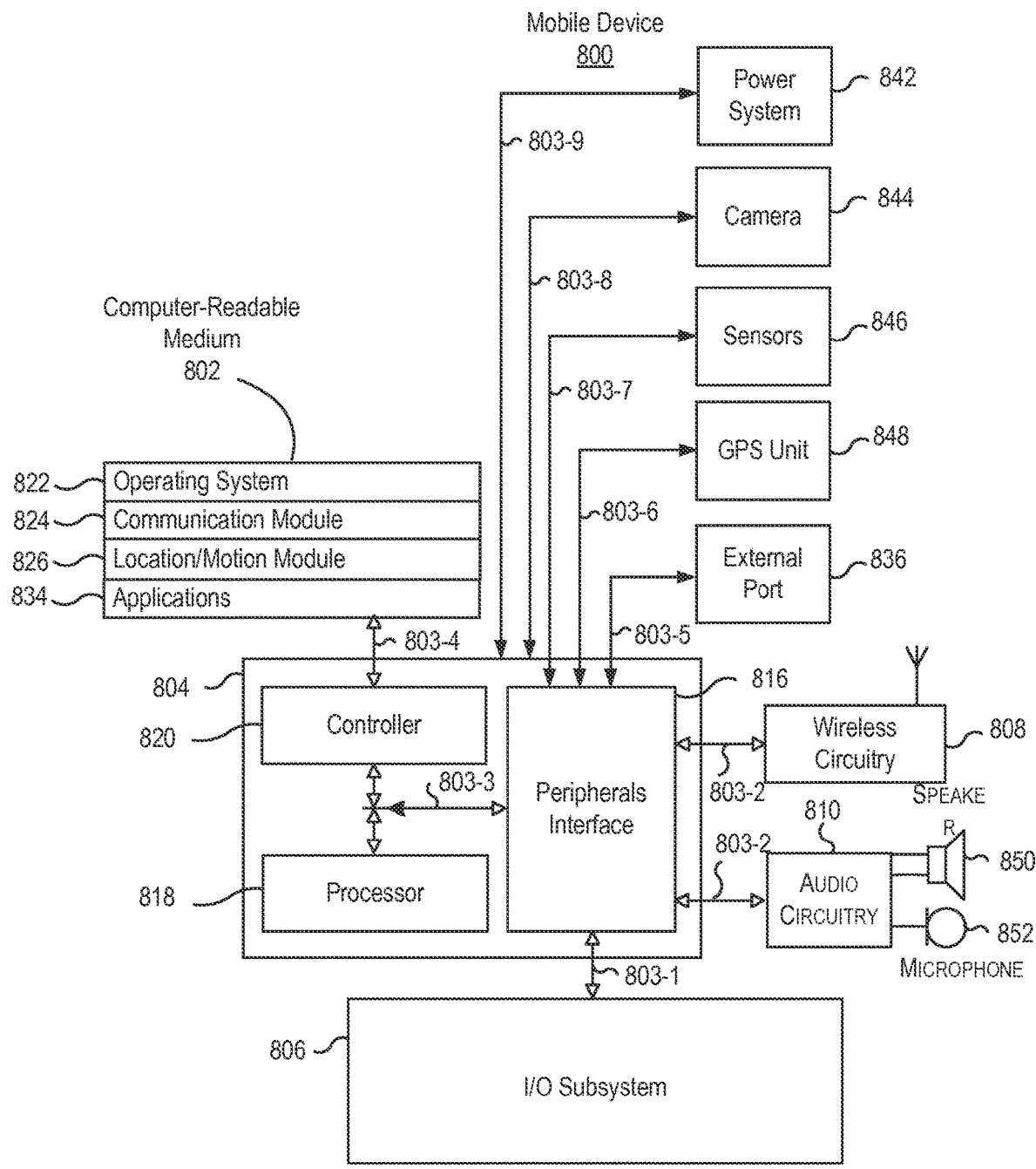
FIG. 8 is a block diagram of a portable electronic device or mobile device according to embodiments of the present invention.

FIG. 8 is a block diagram of a portable electronic device or mobile device 800 according to an embodiment of the invention. Mobile device 800 generally includes computer-readable medium 802, a processing system 804, an Input/Output (I/O) subsystem 806, wireless circuitry 808, and audio circuitry 810 including speaker 850 and microphone 852. These components may be coupled by one or more communication buses or signal lines 803. Device 800 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items. In various embodiments, first device 300 or second device 350 or any other device, server, access point, network element or other computing device or element may be implemented in whole or in part using the elements of FIG. 8.

It should be apparent that the architecture shown in FIG. 8 is only one example of an architecture for mobile device 800, and that device 800 can have more or fewer components than shown, or a different configuration of components. The various components shown in FIG. 8 can be implemented in hardware, software, or a combination of both hardware and software, including one or more signal processing and/or application specific integrated circuits.

Wireless circuitry 808 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. In some embodiments, wireless circuitry 808 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, Wi-Fi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document. A mobile device can include wireless circuitry that can communicate over several different types of wireless networks depending on the range required for the communication. For example, a short-range wireless transceiver (e.g., Bluetooth), a medium-range wireless transceiver (e.g., Wi-Fi), and/or a long range wireless transceiver (e.g., GSM/GPRS, UMTS, CDMA2000 1x/EV-DO and LTE/LTE-Advanced) can be used depending on the type of communication or the range of the communication.

Wireless circuitry 808 is coupled to processing system 804 via peripherals interface 816. Interface 816 can include conventional components for establishing and maintaining communication between peripherals and processing system 804. Voice and data information received by wireless circuitry 808 (e.g., in speech recognition or voice command applications) is sent to one or more processors 818 via peripherals interface 816. One or more processors 818 are configurable to process various data formats for one or more application programs 834 stored on medium 802.

Peripherals interface 816 couple the input and output peripherals of the device to processor 818 and computer-readable medium 802. One or more processors 818 communicate with computer-readable medium 802 via a controller 820. Computer-readable medium 802 can be any device or medium that can store code and/or data for use by one or more processors 818. Medium 802 can include a memory hierarchy, including cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). In some embodiments, peripherals interface 816, one or more processors 818, and memory controller 820 can be implemented on a single chip, such as processing system 804. In some other embodiments, they can be implemented on separate chips.

Mobile device 800 also includes a power system 842 for powering the various hardware components. Power system 842 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, mobile device 800 includes a camera 844. In some embodiments, mobile device 800 includes sensors 846. Sensors can include accelerometers, compass, gyrometer, pressure sensors, audio sensors, light sensors, barometers, and the like. Sensors 846 can be used to sense location aspects, such as auditory or light signatures of a location.

In some embodiments, mobile device 800 can include a GPS receiver, sometimes referred to as a GPS unit 848. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 818 run various software components stored in medium 802 to perform various functions for device 800. In some embodiments, the software components include an operating system 822, a communication module (or set of instructions) 824, a location module (or set of instructions) 826, and other applications (or set of instructions) 834, such as a car locator app and a navigation app.

Operating system 822 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 824 facilitates communication with other devices over one or more external ports 836 or via wireless circuitry 808 and includes various software components for handling data received from wireless circuitry 808 and/or external port 836. External port 836 (e.g., USB, FireWire, Lightning connector, 30-pin connector, etc.) is adapted for coupling directly to other devices or indirectly over a network (e.g., the Internet, wireless LAN, etc.).

Location/motion module 826 can assist in determining the current position (e.g., coordinates or other geographic location identifier) and motion of mobile device 800. Modern positioning systems include satellite based positioning systems, such as Global Positioning System (GPS), cellular network positioning based on "cell IDs," and Wi-Fi positioning technology based on a Wi-Fi networks. Typically, GPS is the most accurate, but often consumes more power than the other positioning systems. GPS also relies on the visibility of multiple satellites to determine a position estimate, which may not be visible (or have weak signals) indoors or in "urban canyons." In some embodiments, location/motion module 826 receives data from GPS unit 848 and analyzes the signals to determine the current position of the mobile device. In some embodiments, location/motion module 826 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 808 and is passed to location/motion module 826. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for mobile device 800 based at least in part on the position coordinates of the corresponding transmitters. Regardless of the specific location technology used, location/motion module 826 receives information from which a location fix can be derived, interprets that information, and returns location information, such as geographic coordinates, latitude/longitude, or other location fix data.

The one or more applications 834 on the mobile device can include any applications installed on the device 800, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc. The one or more applications 834 can also include a specific app for finding a parked car, a maps application, or any other suitable application.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 806 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 806 can include a display and user input devices such as a keyboard, mouse, and/or trackpad. In some embodiments, I/O subsystem 806 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 802) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 800 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

Advantages to certain embodiments of the invention include automatically marking a parking location when it is determined that a car is in a parked state. This can be done without prompting by the user and therefore the user does not have to remember to manually mark a parking location. This improves the user experience and is more convenient for the user.

Further advantages to certain embodiments of the invention include enabling parking location marking in weak location signal scenarios. Some embodiments of the invention permit marking a car's parking location without using transponders in parking areas (e.g., transponder near parking spots) to transmit a unique identifier which can be used to locate a parking spot.

In some embodiments, some or all of the operations described herein can be performed using an application executing on the user's mobile device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. Any such computer readable medium may reside on or within a single computer product (e.g. a hard drive, a CD, or an entire computer system), and may be present on or within different computer products within a system or network. In addition program code may be encoded and transmitted via wired optical, and/or wireless networks conforming to a variety of protocols, including the Internet, thereby allowing distribution, e.g., via Internet download.

Although the invention has been described with respect to specific embodiments, it will be appreciated that the invention is intended to cover all modifications and equivalents within the scope of the following claims.

What is claimed is:

1. A method comprising:
   at a mobile device comprising wireless circuitry, a memory, and a processor coupled to the memory and the wireless circuitry:
   communicating, via the wireless circuitry, with an identity services server to receive a wearable-device identifier associated with a wearable device, the wearable device previously registered with the identity services server;
   communicating a data packet to the wearable device via the wireless circuitry, the data packet comprising the wearable-device identifier, a payload, and an application identifier that identifies a second application from among a plurality of applications operating on the wearable device;
   receiving, from a communication management process of the wearable device, a first acknowledgement, generated at a communication management level, indicating that the data packet was received at the wearable device; and
   receiving, from the second application of the wearable device, a second acknowledgement, generated at an application level, indicating that the payload of the data packet has been processed by the second application operating on the wearable device.

2. The method of claim 1, wherein communicating the data packet to the wearable device comprises:
   communicating the payload from a first application of the mobile device to the communication management process of the mobile device.

3. The method of claim 1, wherein communicating the data packet to the wearable device further comprises:
   communicating the data packet from a first identity services daemon of the mobile device to the identity services server for relay to the wearable device.

4. The method of claim 1, wherein the communication management process of the mobile device comprises a first identity services daemon of the mobile device.

5. The method of claim 1, further comprising: at the mobile device:
communicating a second data packet to the wearable device in response to receipt of the second acknowledgement.

6. The method of claim 1, further comprising: at the mobile device:
determining that the second acknowledgement has not been received within a predetermined amount of time; and
delaying transmission of an additional data packet in response to the determination that the second acknowledgement has not been received within the predetermined amount of time.

7. The method of claim 1, wherein the second acknowledgement is received from a second identity services daemon of the wearable device.

8. The method of claim 1, further comprising:
communicating, by a push notification daemon of the mobile device via the wireless circuitry, with a push notification server to identify a connection between the mobile device and the wearable device.

9. The method of claim 1, wherein the first acknowledgement comprises a push acknowledgement from a second push notification daemon of the wearable device.

10. The method of claim 1, wherein the first acknowledgement and the second acknowledgement are received as part of a combined acknowledgement communication, the combined acknowledgement communication comprising a flag setting indicating that the combined acknowledgement communication comprises the first acknowledgement and the second acknowledgement.

11. The method of claim 1, wherein the wearable-device identifier is received after the identity services server authenticates an identity of the wearable device.

12. The method of claim 1, further comprising: receiving, in response to communicating the data packet to the wearable device, a transmission channel acknowledgement in addition to the first acknowledgement and the second acknowledgement.

13. A first device comprising:
wireless circuitry;
a memory; and
at least one processor coupled to the memory and the wireless circuitry, the at least one processor configured to:
communicate, via the wireless circuitry, with an identity services server to receive a second identifier associated with a second device;
communicate a data packet to the second device via the wireless circuitry, the data packet comprising the second identifier and a payload;
receive from a communication management process of the second device, a first acknowledgement, generated at a communication management level, indicating that the data packet was received at the second device; and
receive from a second application of the second device, a second acknowledgement, generated at an application level, indicating that the payload has been processed by the second application operating on the second device, wherein the second device is a wearable device.

14. The first device of claim 13, wherein the at least one processor is further configured to:
determine that the second acknowledgement has not been received within a predetermined amount of time; and
delay transmission of a third data packet in response to a determination that the second acknowledgement has not been received within the predetermined amount of time.

15. The first device of claim 13, wherein the at least one processor is further configured to:
communicate a second data packet to the second device in response to receipt of the second acknowledgement.

16. The first device of claim 13, wherein the wireless circuitry comprises a near field communication interface; and
wherein communicating the data packet to the second device is performed using the near field communication interface as part of a peer to peer connection between the first device and the second device.

17. A computer product comprising a non-transitory computer readable medium storing a plurality of instructions that, when executed, control a first device comprising wireless circuitry, a memory, and a processor coupled to the memory and the wireless circuitry to perform a method of implementing application-level acknowledgements, the instructions comprising:
communicating, via the wireless circuitry, with an identity services server to receive a wearable-device identifier associated with a wearable device, the wearable device previously registered with the identity services server;
communicating a data packet to the wearable device via the wireless circuitry, the data packet comprising the wearable-device identifier, a payload, and an application identifier that identifies a second application from among a plurality of applications operating on the wearable device;
receiving from a communication management process of the wearable device, a first acknowledgement, generated at a communication management level, indicating that the data packet was received at the wearable device; and
receiving from the second application of the wearable device, a second acknowledgement, generated at an application level, indicating that the payload of the data packet has been processed by the second application operating on the wearable device.

18. The computer product of claim 17, wherein the instructions further comprise:
receiving, by the communication management process of the first device, a second data packet comprising a second payload and a first identifier associated with the first device;
communicating a third acknowledgement to the wearable device using the wearable-device identifier, the third acknowledgement verifying receipt of the second data packet;
processing the second payload using a first application of the first device;
verifying that the second payload was processed by the first application; and
communicating from the first device to the wearable device, a fourth acknowledgment verifying that the second payload was processed by the first application of the first device.

19. The computer product of claim 17, wherein the instructions further comprise:
determining that the second acknowledgement has not been received within a predetermined amount of time; and delaying transmission of a third data packet in response to the determination that the second acknowledgement has not been received within the predetermined amount of time.

20. The computer product of claim 17, wherein the instructions further comprise:

communicating a second data packet to the wearable device in response to receipt of the second acknowledgement.

\* \* \* \* \*